United States Patent [19]

Yamatsuta

[11] Patent Number: 4,925,471
[45] Date of Patent: May 15, 1990

[54] METHOD OF RESTARTING OPERATIONS FOR MANUFACTURING FILAMENTS OF A THERMOPLASTIC MATERIAL AFTER AN ACCIDENT OF THE BREAKING

[75] Inventor: Kiichi Yamatsuta, Kanagawa, Japan

[73] Assignee: Asahi Fiber Glass Company Limited, Tokyo, Japan

[21] Appl. No.: 308,464

[22] Filed: Feb. 10, 1989

[30] Foreign Application Priority Data

Feb. 12, 1988 [JP] Japan .................................. 63-28944

[51] Int. Cl.$^5$ ............................................. C03B 37/02
[52] U.S. Cl. ......................................... 65/2; 264/169; 65/1
[58] Field of Search .......................... 65/1, 2; 264/169

[56] References Cited

U.S. PATENT DOCUMENTS

| | | | |
|---|---|---|---|
| 3,979,195 | 9/1976 | Strickland | 65/1 |
| 3,982,915 | 9/1976 | Coggin | 65/1 |
| 4,088,467 | 5/1978 | Shono et al. | 65/2 |
| 4,130,406 | 12/1978 | Wakasa et al. | 65/2 |
| 4,473,386 | 9/1984 | Strickland | 65/1 |

*Primary Examiner*—Robert L. Lindsay
*Attorney, Agent, or Firm*—Oblon, Spivak, McClelland, Maier & Neustadt

[57] ABSTRACT

In a method of restarting operations for manufacturing filaments from a molten mass of a thermoplastic material after the occurrence of the breaking of a filament, the filaments being drawn at a regular, high speed from a large number of orifices formed in the bottom of a bushing, a bead of the molten mass formed at an orifice where the breaking of a filament occurs is detected to thereby generate a signal; the speed of elongating the filaments is reduced upon receiving the signal so that a filament elongated in the vicinity of the bead at the reduced speed is brought into contact with the bead elongated by gravity, and elongates the bead into a filament having a larger diameter, during which operations to produce a regular filament product are stopped; and the speed of elongating the filaments is increased to the regular speed.

3 Claims, 3 Drawing Sheets

METHOD OF RESTARTING OPERATIONS FOR MANUFACTURING FILAMENTS OF A THERMOPLASTIC MATERIAL AFTER AN ACCIDENT OF THE BREAKING

The present invention relates to a method of restarting operations for manufacturing filaments from a molten mass of a thermoplastic material elongated at a regular, high speed from a large number of orifices formed in the bottom of a bushing when the breaking of a filament takes place. More particularly, it relates to a method of restarting automatically and easily operations for manufacturing the filaments when the breaking of a filament takes place, without causing that the cut filament influences the other filaments.

Figure 1:
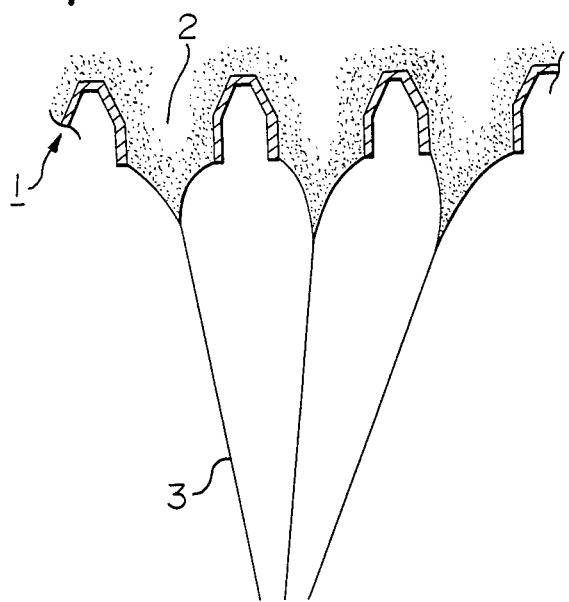

Filaments 3 of a thermoplastic material such as glass have been manufactured by elongating a molten mass of the thermoplastic material which flows through a large number of orifices 2 formed in the bottom of a bushing 1 at a regular, high speed which is determined dependent on a diameter of the filaments, as shown in FIG. 1.

When glass filaments are to be manufactured, a bushing 1 provided with the orifices 2 having a diameter of 0.5 mm–1/5 mm is used. A strand is formed by gathering a number of glass filaments thus formed by means of a binding agent. In this case, there happens the breaking of a filament 3 (the primary accident) by any cause.

Figure 2:
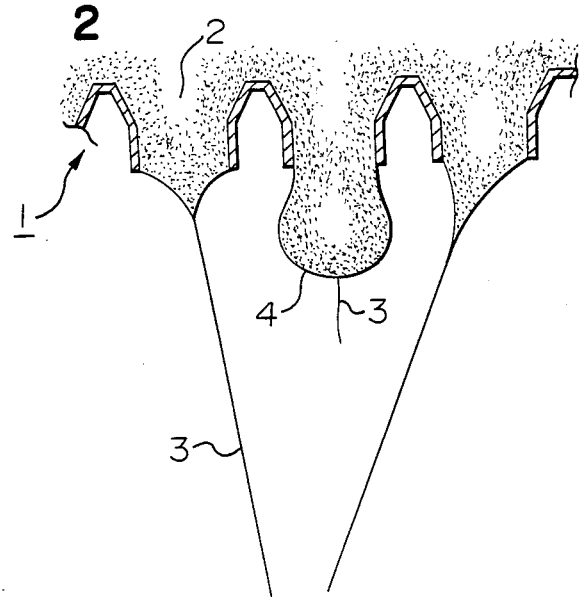
Figure 5:
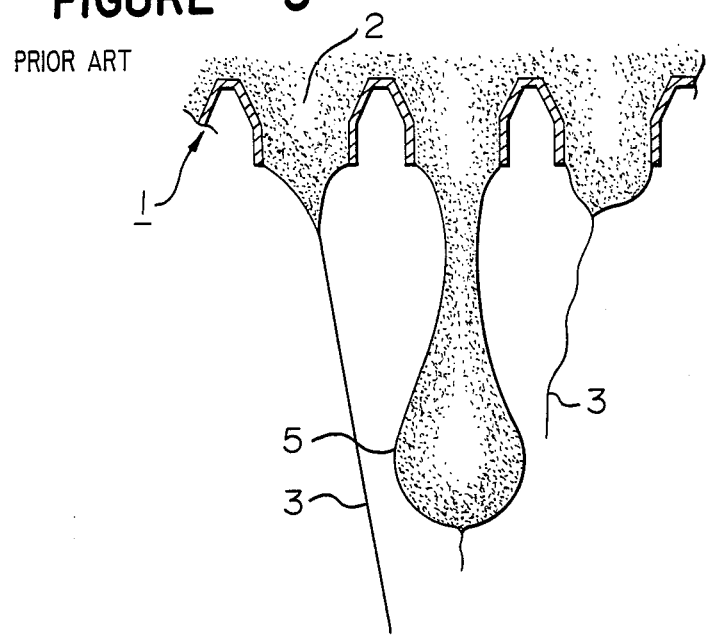
Figure 6:
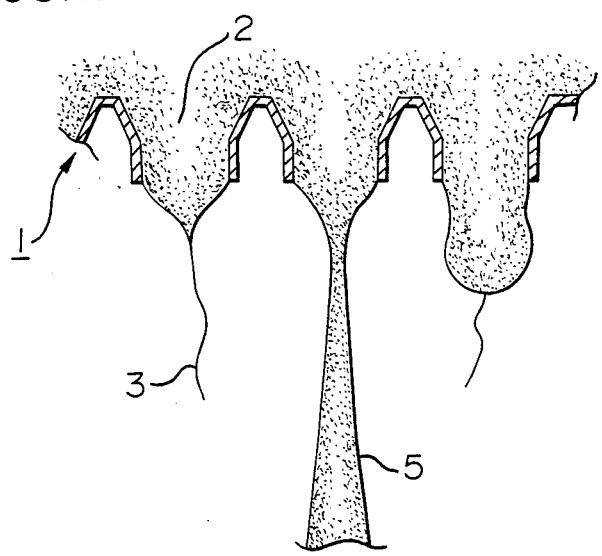

When the breaking of the filament 3 occurs, a bulbous bead 4 having a substantially spherical form of the molten plastic material is produced at the corresponding orifice 2 as shown in FIG. 2. The bulbous bead 4 is gradually elongated by gravity, so that a spindle-like bead 5 elongated in a spindle form is produced. If filament-gathering operations is continued as it is, the spindle-like bead 5 successively comes in contact with other filaments 3, whereby the breaking of the other filaments occurs (secondary accident) as shown in FIGS. 5 and 6. Thus, the secondary accident successively spreads to thereby cause the breaking of the entire filaments.

Heretofore, when the breaking of filaments occurred, the filament gathering operations were restarted by interrupting the operations and by pulling the bead and non-cut filaments to elongate them by manual operations. However, such conventional restarting operations required much time to thereby increase labor cost and reduce productivity.

In order to eliminate the disadvantage as described above, there is a proposal in Japanese Unexamined Pat. Publication No. 62-187136 that a number of orifices formed in a bushing are arranged in each pair of orifices in close-relationship so that when a filament flowing from either one of the paired orifices is broken, two streams of molten glass flowing through the paired orifices are merged, and the merged molten glass is elongated by pulling the filament flowing through the other orifice. However, the proposed method has the disadvantages as follows. A filament formed by merging the two streams of the molten glass flowing through the paired orifices is thick, especially just after the merging. Therefore, the product having uniform quality is not obtainable because the thick filament is mixed with filaments having the regular diameter.

Since the orifices in the bushing are arranged in each pair, it is difficult to separate a single merged molten glass stream into two filaments having the regular diameter.

In the conventional restarting operations, there was the following disadvantage in addition those as above mentioned.

When the entire filaments are broken, a flow rate of the molten material flowing down from the bushing is reduced. Accordingly, the temperature of the molten material in the bushing rapidly changes or becomes uncontrolled and the diameter of the filaments fluctuates at the time of restarting the filament-gathering operations, whereby the filament having a uniform strength can not be obtained.

It is an object of the present invention to provide a method of restarting automatically filament-gathering operations to obtain filaments having a uniform diameter without any risk of the spreading of the breaking of the filaments.

The foregoing and other objects of the present invention have been attained by providing a method of restarting operations for manufacturing filaments from a molten mass of a thermoplastic material, being drawn at a regular, high speed from a large number of orifices formed in the bottom of a bushing, after the occurrence of the breaking of a filament, the method of restarting comprising: (a) a step of detecting a bead of the molten mass formed at an orifice where the breaking of a filament occurs, to thereby generate a signal; (b) a step of reducing the speed of elongating the filaments upon receiving the signal so that a filament elongated in the vicinity of the bead at the reduced speed is brought into contact with the bead elongated by gravity, and elongating the bead into a filament having a larger diameter, during which operations to produce a regular filament product are stopped; and (c) a step of increasing the speed of elongating the filaments to the regular speed.

FIGS. 1 through 4 are respectively diagrams showing a method of restarting filament-gathering operations in accordance with the present invention; and FIGS. 5 and 6 are respectively diagrams showing a conventional process which cause the entire breaking of filaments.

Referring to the drawings, wherein the same reference numerals designate the same or corresponding parts throughout the several views, and more particularly to FIGS. 1 through 4 thereof, there are shown diagrams of an example of the method of restarting filament-gathering operations of the present invention.

Molten glass streams flowing through orifices 2 in a bushing 1 are elongated at a regular, high speed of ranging from 300 m/min to 1,000 m/min, whereby filaments having a diameter in a range of 3 $\mu$m–20 $\mu$m are produced. A binding agent is applied to the filaments in accordance with a known method. Then, the filaments are gathered into a strand at a gathering device (not shown) and thereafter, the strand is wound by a winding device rotated at a high speed. Thus, the strand of glass filaments is produced. The filaments are elongated at the regular speed by the winding device. The strand may be pulled by utilizing a resistance of contact with a pulling wheel. In this case, the molten glass streams are elongated by a pulling force.

When a bulbous bead 4 is produced due to the breaking of the filament 3, it is detected so that a signal is generated. Since the diameter of the bulbous bead 4 is about 500–2,000 times as much as the filament 3, the bulbous bead can be detected by a detecting means such as an image sensor which should not be in any way limited.

The detecting signal is supplied to a control device so that a speed for elongating the filaments is reduced to a speed which is 1/3–1/50, preferably 1/6–1/30 times as much as the regular speed. In this case, all the filaments are elongated at the reduced speed. Then, the filaments become thicker and the bead comes in contact with a single or plurality of such filaments. As a result, the bead is elongated to be a thin filament.

When the value of the reduced speed exceeds the above-mentioned range, the diameter of the filament is insufficient. In this case, when such filament is brought to contact with a spindle-like bead 5 which is developing, the filament is apt to break.

On the other hand, the value of the reduce speed is less than the above-mentioned range, the diameter of the filament becomes too much, whereby the strand is apt to break. Further, it takes much time to begin re-starting operations.

It is practically reasonable that the speed of elongating the filaments is reduced by reducing a revolution number of the winding device. However, it is feasible that the strand is pulled at a low speed by means of an additional pulling roller while the filament-gathering operations to manufacture the regular product are stopped.

When the revolution number of the winding device is to be reduced, it is preferable that a strand consisting of a thicker filament is wound separate from a strand having the regular diameter wound at the regular speed. With such measures, it is possible to use the strand, as a desired product, wound at the regular speed before occurrence of an accident of the breaking of a filament as a product. In order to wind the strand usable as a desired product separately from a defective strand, a turret winder can be preferably used.

Figure 3:
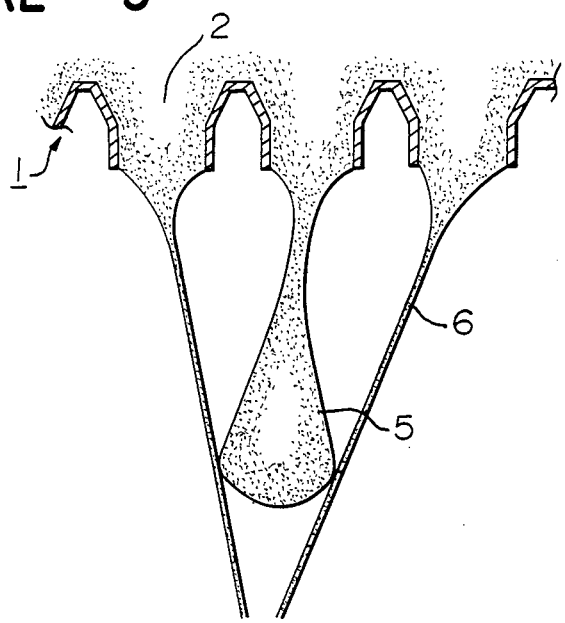
Figure 4:
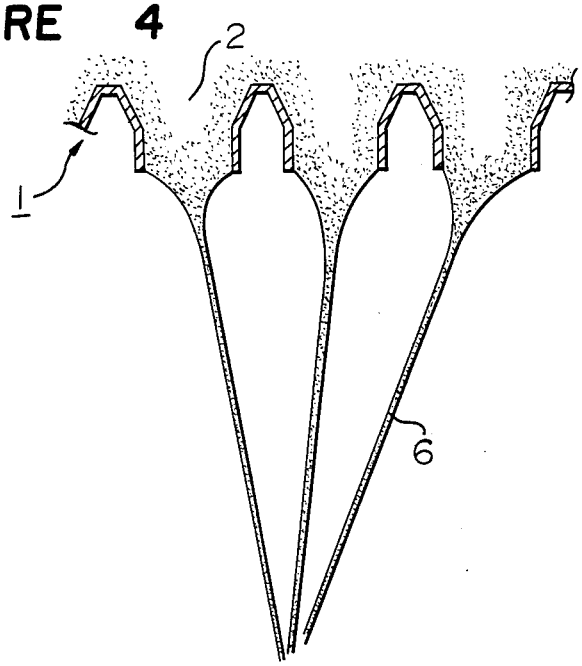

Thus, the filament 6 having a large diameter elongated at a low speed is brought to contact with the spindle-like bead 5 elongated by gravity (FIG. 3). By the above-mentioned contact, the spindle-like bead 5 is elongated at the same or nearly the same speed as the filaments 6 and becomes a filament having the same diameter as the filaments 6; thus, the bead 5 disappears.

When a spherical bead 4 occurs and the spherical bead 4 is transformed into the spindle-like bead 5 elongated by the gravity, it results in occurrence of the secondary accident of the breaking of a filament. A time from the generation of the spherical bead to the breaking is determined by the viscosity of the molten glass, the diameter of the orifices 2 and so on, and is usually in a range of 1 sec–10 sec. Therefore, it is necessary to reduce the speed of elongating the filaments to the above-mentioned range within that time.

The filament-gathering operations can be restarted by increasing the speed of elongating the filaments to the regular speed.

The speed of elongating the filaments may be increased after the detecting device has detected the disappearance of the bead. Alternatively, the speed may be increased a predetermined time after the reduction of the speed of elongating, said time being obtained empirically.

When the filaments are pulled at a low speed, it is preferable to retract a binding agent coating device (not shown) so as not to come the device in contact with any of the filaments.

Description has been made as to the elongation of glass filaments. However, the method of the present invention is applicable to the manufacture of filaments from a molten mass of a resinous material.

(EXAMPLE)

Streams of molten glass flowing through orifices formed in the bottom of a bushing were pulled at a regular speed of 10 m/sec to form glass filaments having a diameter of 10 μm.

The breaking of a filament was caused, and a bead resulted by the breaking of the filament was detected by an image sensor. A speed of elongating the filaments was reduced to 1 m/sec on the basis of a signal generated from the image sensor to thereby form glass filaments having a diameter of 33 μm. Since the generation of the signal, filament-gathering operations to manufacture a normal product were interrupted.

A time required to reduce the speed of elongating the filaments was about 3 sec. The bead elongated by gravity was brought to contact with the filament having a large diameter so that a filament having the same thicker diameter was formed. Then, the speed of elongating the filaments was increased to a regular speed to restart the filament-gathering operations. A time required for restarting was 8 sec.

Thus, in accordance with the present invention, an accident of the entirely breaking of the filaments can be avoided and the filament-gathering operations can be automatically started after the breaking of the filaments has partially occurred. Filaments having a uniform diameter are obtainable.

I claim:

1. A method of restarting operations for manufacturing filaments from a molten mass of a thermoplastic material after the occurrence of the breaking of a filament with the production of a bulbous bead, said filaments being drawn at a regular, high speed from a large number of orifices formed in the bottom of a bushing, said method of restarting comprising:

(a) a step of detecting the bead of said molten mass formed at an orifice where the breaking of a filament occurs, to thereby generate a signal;

(b) a step of reducing the speed of elongating said filaments upon receiving said signal so that a filament elongated in the vicinity of said bead at the reduced speed is brought into contact with said bead elongated by gravity and elongates the bead into a filament having a larger diameter, during which operations to produce a regular filament product are stopped, the reduction in speed being such that the filament elongated in the vicinity of said bead at the reduced speed grows to sufficient diameter to resist breakage when contacting said bead, but the reduction in speed not being so large that the filaments being formed grow to a diameter whereby the strand being formed is likely to break; and (c) step of increasing the speed of the elongating of said filaments to the regular speed.

2. The method of restarting operations for manufacturing filaments according to claim 1, wherein said reduced speed is 1/3–1/50 times as much as the regular speed.

3. The method of restarting operations for manufacturing filaments according to claim 2, wherein said reduced speed is 1/6–1/30 times as much as the regular speed.

* * * * *